United States Patent
Hibbert

(10) Patent No.: US 6,761,236 B2
(45) Date of Patent: Jul. 13, 2004

(54) REVERSIBLE REAR AXLE MOUNT

(75) Inventor: Kirk Hibbert, Goodrich, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 120 days.

(21) Appl. No.: 10/093,249

(22) Filed: Mar. 6, 2002

(65) Prior Publication Data

US 2003/0168262 A1 Sep. 11, 2003

(51) Int. Cl.[7] .............................................. B62D 55/00

(52) U.S. Cl. ...................... 180/9.52; 305/153; 305/125; 305/127; 305/154; 305/156

(58) Field of Search ............................... 180/9.5, 9.52, 180/193, 194, 195, 231, 351; 305/125, 127, 141, 153, 154, 156; 198/816

(56) References Cited

U.S. PATENT DOCUMENTS

| | | | | |
|---|---|---|---|---|
| 1,438,859 A | * | 12/1922 | Rimailho | 305/180 |
| 3,485,312 A | * | 12/1969 | Swenson et al. | 180/193 |
| 3,893,526 A | * | 7/1975 | Esch | 180/193 |
| 4,068,905 A | * | 1/1978 | Black et al. | 305/51 |
| 4,093,033 A | * | 6/1978 | Rosch | 180/9.56 |
| 5,474,146 A | * | 12/1995 | Yoshioka et al. | 180/184 |
| 6,250,409 B1 | * | 6/2001 | Wells | 180/9.52 |

* cited by examiner

*Primary Examiner*—Lesley D. Morris
*Assistant Examiner*—Daniel Yeagley
(74) *Attorney, Agent, or Firm*—Merchant & Gould, P.C.

(57) ABSTRACT

An axle mount device for mounting an axle to a snowmobile track suspension frame has a base portion and an adjuster portion. The base portion has an axis and a bore coincident with the axis. The adjuster portion is secured to the base portion asymmetrically with respect to the axis, and engages an opening in the frame. The axle mount may be moved between first and second positions to vary a position of the axle with respect to the frame.

14 Claims, 5 Drawing Sheets

US 6,761,236 B2

REVERSIBLE REAR AXLE MOUNT

BACKGROUND OF THE INVENTION

This invention relates to a rear axle mount for a straddle-mounted vehicle. More particularly, the invention relates to a reversible axle mount for a snowmobile that is capable of adjusting an effective length of the snowmobile track.

Snowmobiles are a widely used means of transportation in snowy regions. They are especially popular for recreational purposes such as trail riding or racing. Snow conditions and the riding terrain can significantly affect a snowmobile's performance. For example, when deep, less packed snow conditions exist, a longer track (i.e., the distance over which the track contacts the surface on which the snowmobile is driven) is desired for optimum performance. When icy or hard-packed snow conditions exist, a shorter track is desired for optimum performance.

In a typical snowmobile track design, the track is either permanently fixed at a given length without the ability to be changed to a different length, or the track must be exchanged for a different track in order to have a longer or shorter effective track length. It would be desirable to provide a way to make adjustments in the effective length of a snowmobile track in a simple and inexpensive manner.

SUMMARY OF THE INVENTION

It is the purpose of the present invention to provide an adjustable axle mount for mounting an axle to a snowmobile track suspension frame. The axle mount includes a base portion that has an axis and a bore that extends through the base portion coincident with the axis and engages the axle. The axle mount also includes an adjuster portion that engages an open portion of the frame and is secured to the base portion asymmetrically with respect to the axis. When the axle mount is adjusted, the asymmetry of the axle mount functions to alter the axle's position with respect to the frame.

The present invention is particularly relevant to changing the effective length of a snowmobile track. When the axle mount is adjusted from a first position to a second position, the effective length of a snowmobile's endless track is also changed.

The above summary of the present invention is not intended to describe each embodiment or every implementation of the present invention. The Figures and the detailed description that follow more particularly exemplify a preferred embodiment.

BRIEF DESCRIPTION OF THE DRAWINGS

The invention may be more completely understood in consideration of the following detailed description of preferred embodiments of the invention in connection with the accompanying drawings, in which.

Figure 1:
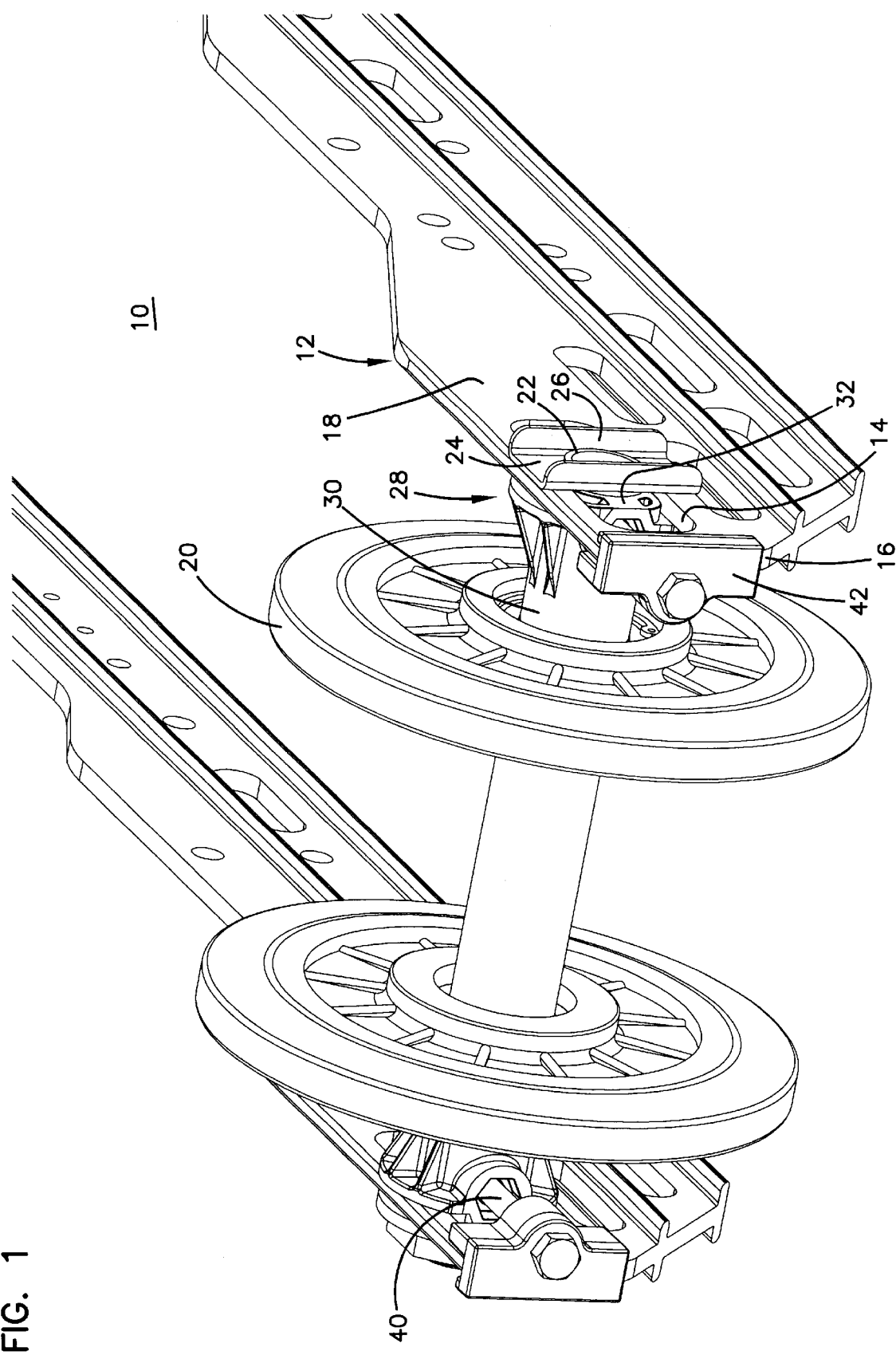
FIG. 1 is a rear perspective view of an axle assembly having an axle mount, according to the invention.

While the invention is amenable to various modifications and alternative forms, the specifics thereof have been shown by way of example in the drawings and will be described in detail. It should be understood, however, that the intention is not to limit the invention to the particular embodiment described. On the contrary, the intention is to cover all modifications, equivalents, and alternatives falling with in the spirit and scope of the invention.

DETAILED DESCRIPTION

The present invention is believed to be applicable to axle mounts having an asymmetrical configuration. In particular, the present invention is directed to a reversible rear axle mount for a snowmobile that utilizes the asymmetrical features of the present invention. While the present invention may not be so limited, an appreciation of various aspects of the invention will be gained through a discussion of the example provided below.

As used herein, "asymmetric" and "asymmetrical" is defined as being not symmetrical about a given point or defined axis. Thus, a 180-degree rotation of an asymmetric component about a given point or a defined axis would alter the effective asymmetry by 180 degrees also.

As used herein, "chassis" refers to the structure that carries a frame or slide rail to which an axle is mounted. The chassis may represent the chassis of a vehicle, such as a snowmobile.

As used herein, "effective track length" is defined as the distance over which a track contacts the surface on which the track is being applied. In the case of a snowmobile, the effective length is the distance over which the snowmobile track contacts a surface over which the snowmobile is being driven. The optimum performance of a snowmobile may be affected by the effective track length under a given snow or ice condition.

Figure 2:
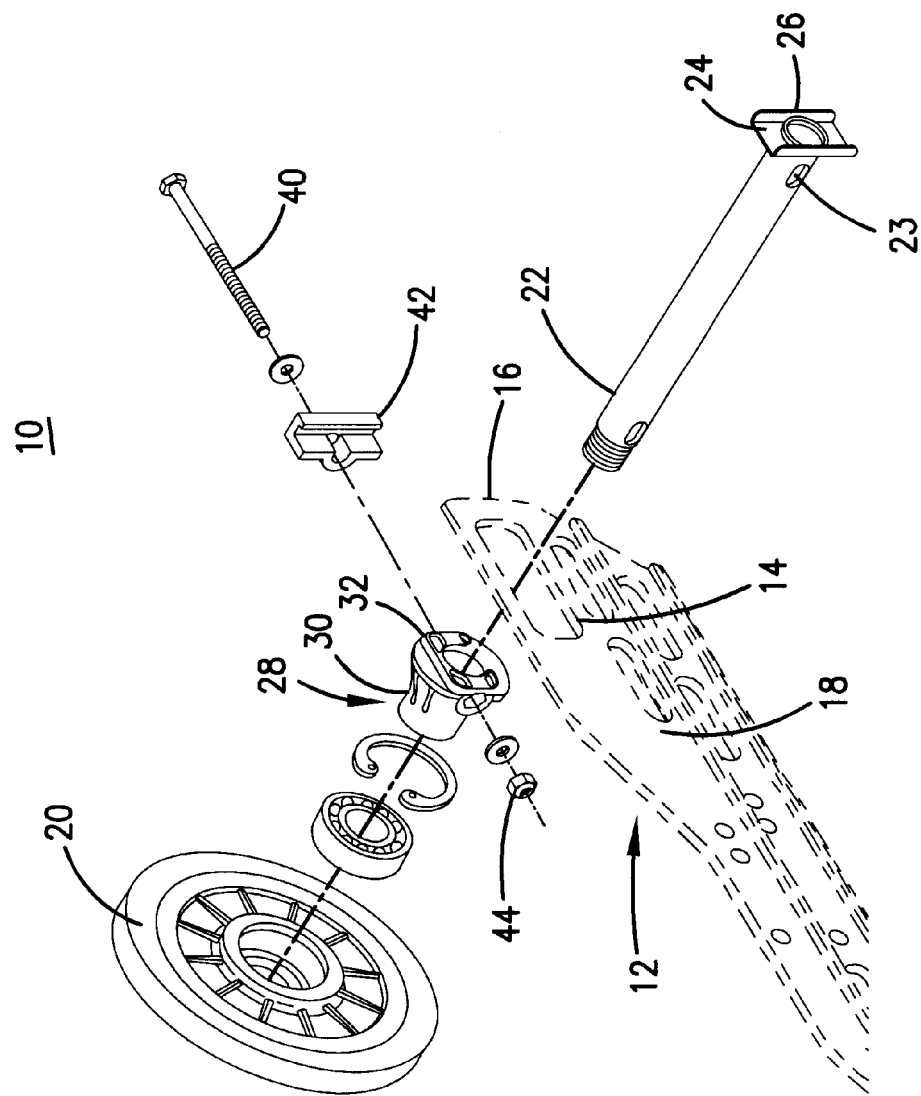
FIG. 2 is an exploded front perspective view of the axle assembly of FIG. 1.
Figure 3:
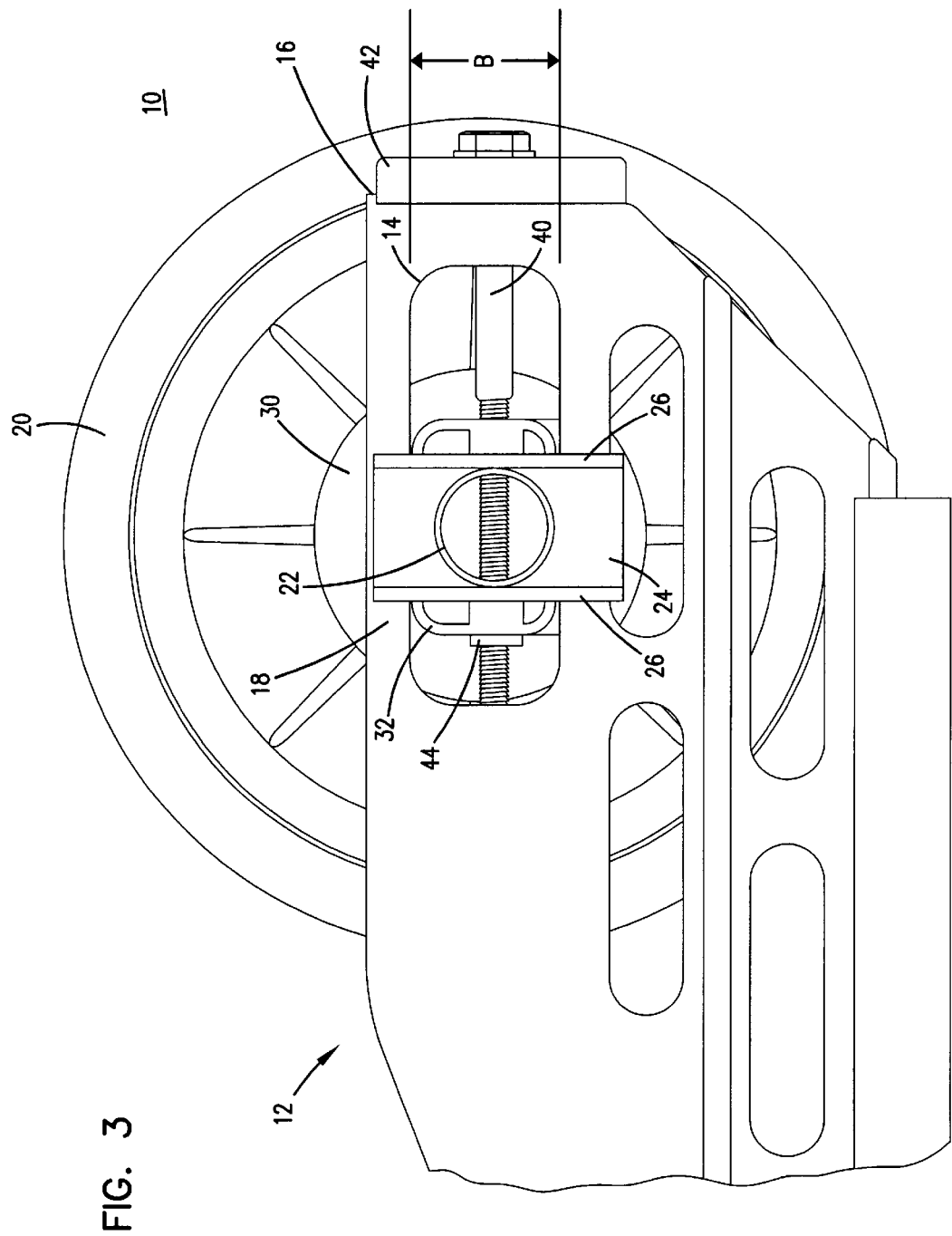
FIG. 3 is a side view of the axle assembly of FIG. 1.
Figure 4:
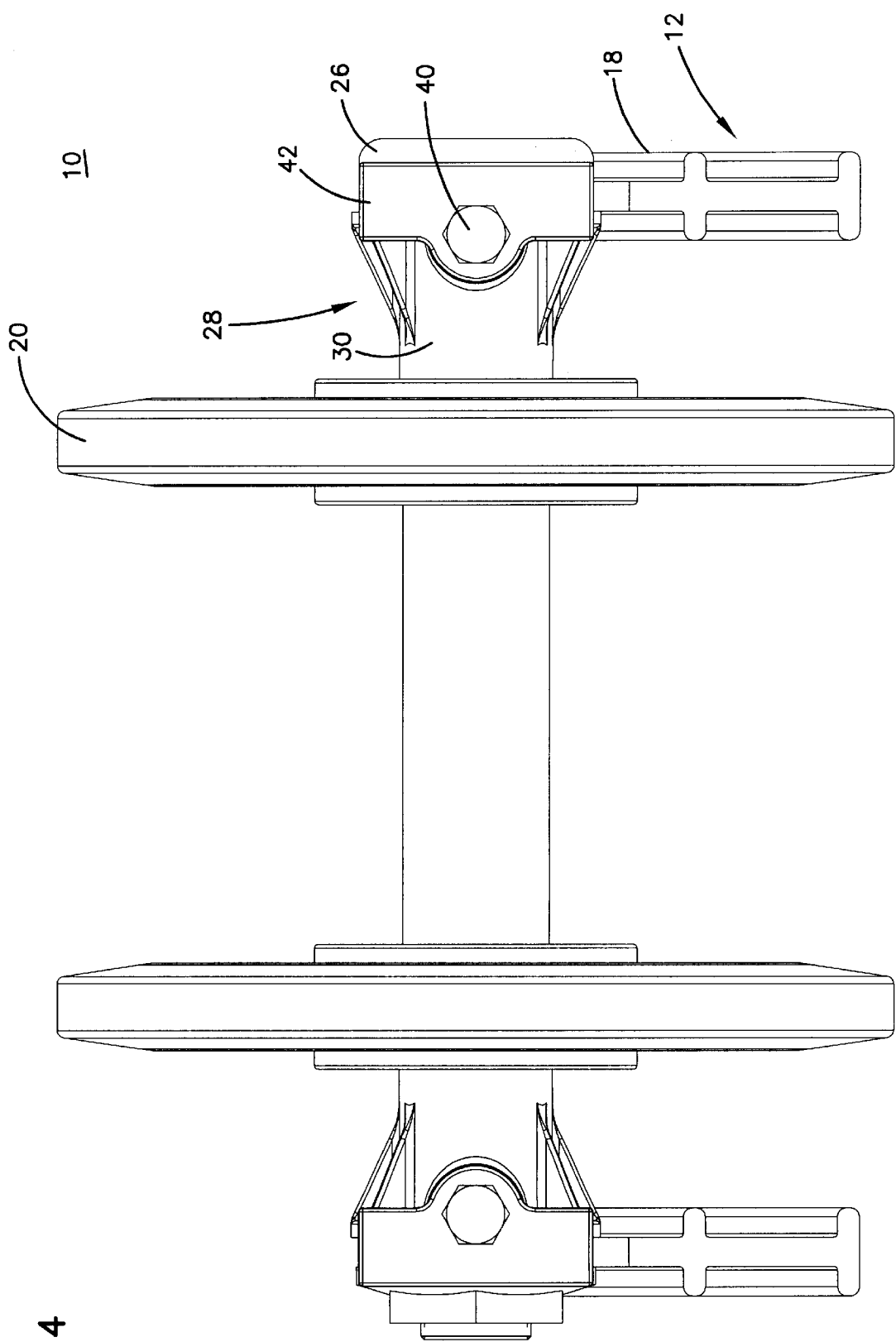
FIG. 4 is a rear view of the axle assembly of FIG. 1.

FIG. 1 is a schematic perspective view of an axle assembly 10 illustrating an axle mount embodiment of the present invention. FIG. 2 illustrates an exploded front perspective view of axle assembly 10, FIG. 3 illustrates a side view of axle assembly 10, and FIG. 4 illustrates a rear view of axle assembly 10. FIGS. 1–4 illustrate the relative placement of the various axle assembly components, but are not intended to be limiting or to identify the relative sizes of the individual components, nor the individual features of the axle mount of the invention. Throughout the specification, examples of axle mounts are provided; however, these examples are not meant to be limiting.

Axle assembly 10, as illustrated in FIGS. 1–4, includes a snowmobile track suspension frame 12 having an open portion 14, an end portion 16, and a frame face surface 18. Assembly 10 also includes an idler wheel 20 and an axle 22 having an axle end plate 24 with support members 26. Assembly 10 further includes an axle mount 28 that includes an axle mount base 30 and an axle mount adjuster portion 32. Axle mount 28 is illustrated and described in greater detail with regard to FIGS. 5–8. Lastly, assembly 10 includes an adjustment mechanism that includes a shaft 40, an attachment plate 42 and a nut 44 (see FIGS. 2 and 3).

FIGS. 1 and 2 illustrate the relationship between axle assembly components in the assembled and unassembled configurations, respectively. When assembling the axle assembly components, the axle 22 is inserted through open portion 14 of frame 12, and then inserted through axle mount 28 and idler wheel 20. In alternative embodiments, axle 22 may be inserted through other components before or after idler wheel 20 and may further connect to another, opposing portion of frame 12. As illustrated in FIG. 2, axle 22 includes adjustment mechanism bore 23 that, when aligned with an adjustment mechanism bore of axle mount 28, is able to receive adjustment mechanism shaft 40. The adjustment mechanism also includes an adjustment mechanism nut 44 that connect to an end of shaft 40 to assist in adjusting the longitudinal position of axle 22 within frame open portion 14.

Axle 22 also includes an axle end plate 24 with associated axle end plate supports 26. End plate 24 is configured to interface with frame surface 18 to prevent axle 22 from passing through frame open portion 14. Plate supports 26 may add support and strength to plate 24 so that plate 24 may withstand axial or other forces exerted upon it.

Adjustment mechanism attachment plate 42 is configured to receive mechanism shaft 40 and also receive end portion 16 of frame 12. Plate 42 may have flange features, as illustrated in FIGS. 1–3, to support plate 42 against end portion 16 of frame 12 and to receive and support shaft 40. When the axle assembly is assembled, adjustment mechanism shaft 40 and attachment plate 42 act to secure axle 22 and axle mount 28 to frame 12. Typically, when shaft 40 is rotated with adjustment mechanism nut 44 attached to an end of shaft 40 on an opposite side of axle mount 28 from the position of plate 42, axle 22 may be adjusted longitudinally within open portion 14 relative to frame 12.

In other embodiments, different types of adjustment mechanisms may be utilized in place of shaft 40, plate 42 and nut 44. For example, a tensioning mechanism may be used to move axle 22 relative to frame 12 or a setscrew may hold axle 12 in a particular longitudinal position within open portion 14.

Figure 7:
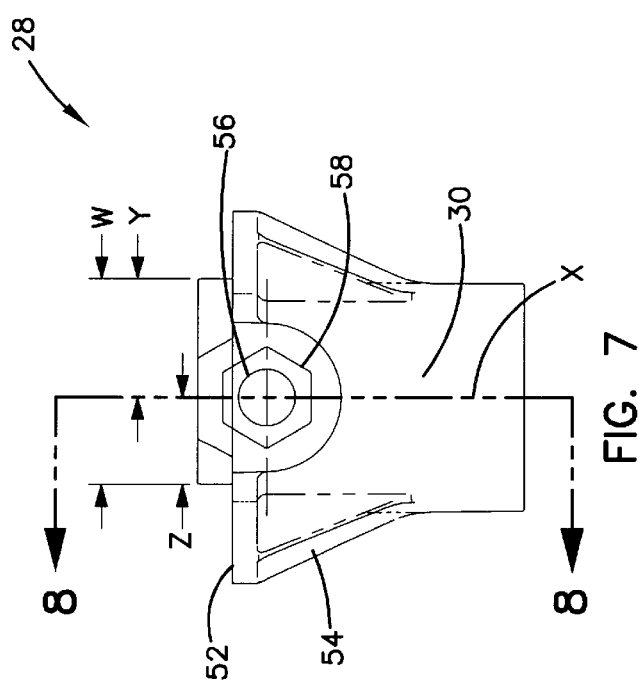
FIG. 7 is a side view of the axle mount of FIG. 5.

Now referring to FIGS. 5–8, axle mount 28 is illustrated and described in detail. Axle mount 28 includes a base portion 30, an adjuster portion 32, an axle bore 50, a mounting face 52, mounting face support members 54, an adjustment mechanism bore 56, and nut recesses or counter bores 58. Adjuster portion 32 may be secured to or integrally formed with mounting 52 and is positioned on mounting face 52 asymmetrically with respect to an axis X that typically extends through a center of axle mount 28. FIG. 7 illustrates a possible configuration and spacing for adjuster portion 32 with respect to axis X and other features of axle mount 28. For example, adjuster portion 32 may have a total width W, a first side width Y measured from axis X to a first side 60 of axle mount adjuster portion 32, and a second side width Z measured from axis X to a second side 62 of adjuster portion 32. Total width W is typically comparable in width to a width B of frame open portion 14 (see FIG. 3), but may not be greater in width than frame open portion width B so that adjuster portion 32 may be inserted, in whole or in part, into open portion 14.

The ratio of first side width Y to second side width Z is not equal to 1.0, and may be greater than 1.0 or less than 1.0. For example, the Y/Z ratio may be between 1.1 to 1.7, and most preferably between 1.3 to 1.5. When adjuster portion 32 has a Y/Z ratio that is not equal to 1.0, the necessary asymmetry required for making vertical adjustments according to the invention is achieved.

Figure 5:
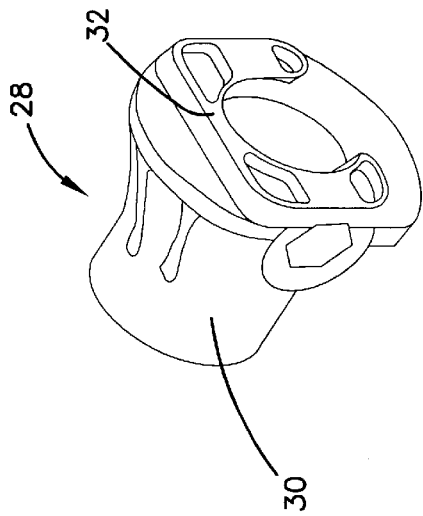
FIG. 5 is a perspective view of an axle mount, according to the invention.
Figure 8:
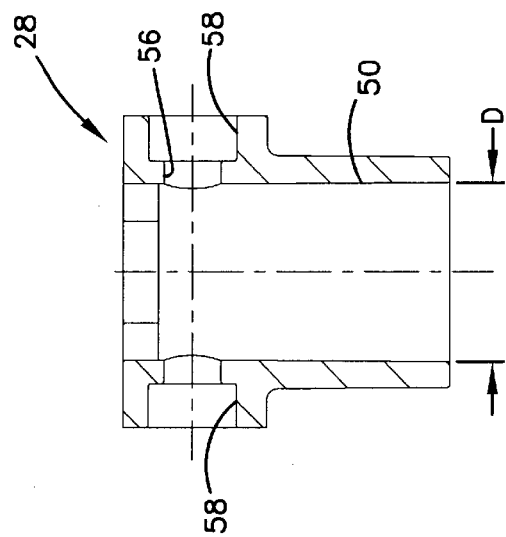
FIG. 8 is a cross-sectional view of the axle mount of FIG. 5.
Figure 6:
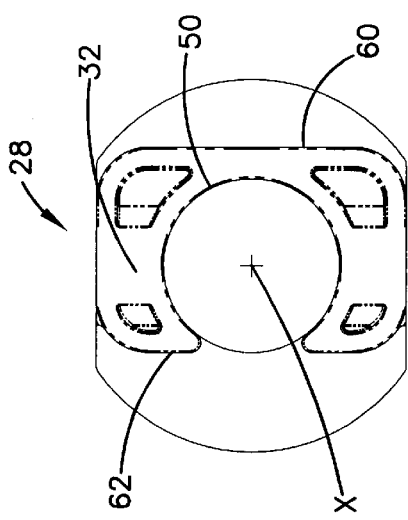
FIG. 6 is a front view of the axle mount of FIG. 5.

FIGS. 5, 7 and 8 most clearly illustrate axle mount 28 having an adjustment mechanism bore 56 with associated nut recess bores 58. Bore 56 is configured to receive adjustment mechanism shaft 40 and is further configured to align with adjustment mechanism bore 23 of shaft 22. According to this embodiment, shaft 40 is able to be inserted through bores 23 and 56 to capture shaft 22 within axle mount 28, to assist in mounting axle 22 to frame 12.

In an embodiment of the invention, axle mount 28 may be rotated within open portion 14 of frame 12 to affect a vertical position of axle 22 with respect to frame 12. Axle mount 28, as illustrated in FIGS. 1 and 3, is in a first position that places idler wheel 20 and axle 22 in first positions. In a second position (not shown), axle mount 28 is rotated 180 degrees about axis X (that is aligned with axle bore 50 and an axis passing through the center of axle 22). In the second position, axle mount 28 is in a second position, higher vertically than the first position, such that idler wheel 20 and axle 22 are also placed in a second position that is vertically higher than the first position with respect to frame 12. Thus, the asymmetrical positioning of adjuster portion 32 on axle mount face plate 52 of base portion 30 may be utilized to change the vertical position of the axle and idler wheel with respect to frame 12.

When utilizing the embodiment illustrated in the assembly of FIGS. 1–4 for a rear axle of a snowmobile, changing the axle mount 28 from the first position to the second position will change the effective track length of an endless track that is supported by idler wheel 20. Thus, by removing adjustment mechanism shaft 40, separating axle mount 28 from frame open portion 14, rotating the axle mount 180 degrees from a first position to a second position, reinserting the axle mount adjuster portion 32 into frame open portion 14, and reinserting the adjustment mechanism shaft 40 into the axle mount and axle, the effective track length of the snowmobile track may be altered in a simple, inexpensive way.

In other embodiments of the invention, the axle mounts may be changed to add or remove features from the embodiment illustrated in FIGS. 1–8. For example, axle mount 28 may be fixed in a single longitudinal position with respect to frame 12, while still providing a way for the axle mount 28 to be reversibly positioned 180 degrees within a modified open portion of frame 12 (as compared to open portion 14) to vertically adjust the position of an axle to which the axle mount is secured. In another embodiment of the invention, recessed area 14 is configured so that the rotation of axle mount 28 within recessed area 14 from a first to a second position adjusts both the vertical position and the horizontal position of axle 22 relative to frame 12.

Base portion 30 and adjuster portion 32, and their associated features, may be composed of the same or different materials, such as, for example, aluminum, plastic, steel, metal alloy, or any other material providing suitable characteristics for an axle mount (e.g., strength and durability). Base portion 30 and adjuster portion 32 may also be secured or adhered together in a variety of ways, for example, using welding, adhesives, or like means for securing members together. Base portion 30 and adjuster portion 32 may also be integrally formed of the same material such that they are monolithic if, for example, they are injection molded or cast as a single part.

The above specification, examples and data provide a complete description of the manufacture and use and composition of the invention. Since many embodiments of the invention may be made without departing form the spirit and scope of the invention, the invention resides in the claims hereinafter appended.

I claim:

1. A device for mounting an axle to a snowmobile track suspension frame, comprising:
   a base portion having an axis and an axle bore extending through the base portion coincident with the axis, the axle bore engaging the axle; and
   an adjuster portion secured to the base portion asymmetrically with respect to the axis, the adjuster portion engaging an open portion of the frame;
   whereby the device can be moved between first and second positions to vary a position of the axle relative to the frame.

2. The device of claim 1 wherein the second position of the axle is at a different vertical position relative to the frame than the first position.

3. The device of claim 1 wherein the base portion further comprises an adjustment bore aligned perpendicular to the axle bore for receiving an adjustment mechanism.

4. The device of claim 3 wherein the adjustment mechanism comprises a rotatable bolt that extends through the adjustment bore, wherein rotation of the bolt causes the device to move longitudinally relative to the frame.

5. The device of claim 1 wherein the base portion comprises a mounting face, and the adjuster portion is secured to the mounting face.

6. The device of claim 5 wherein the base portion comprises support members that support the mounting face.

7. The device of claim 3 wherein the base portion includes counter bores at ends of the adjustment bore in the base portion, the counter bores being sized to receive an adjustment mechanism nut.

8. The device of claim 1 wherein the adjuster portion has a width and a length, the adjuster portion width being substantially the same width as a width of the frame open portion, wherein the adjuster portion may be inserted into the frame open portion.

9. The device of claim 8 wherein the base portion axle bore has a diameter and the adjuster portion width is greater than the diameter of the base portion axle bore.

10. The device of claim 1 wherein the adjuster portion comprises an axle bore aligned with the base portion axle bore.

11. An axle mount for mounting an axle to a snowmobile track suspension frame, the axle mount comprising:
    a base portion having a bore for receiving an axle, the bore extending coincident with an axis of the base portion; and
    an adjuster portion secured to the base portion asymmetrically with respect to the axis, the adjuster portion engaging an opening in the frame.

12. A snowmobile, comprising:
    a rear axle;
    an endless track engaging an idler wheel secured to the rear axle;
    a track suspension frame having an open portion; and
    a rear axle mount for mounting the rear axle to the frame, the rear axle mount comprising a base portion having an axis and a bore aligned with the axis, the bore engaging the rear axle, and an adjuster portion secured to the base portion asymmetrically with respect to the axis, the adjuster portion engaging the frame open portion.

13. The snowmobile of claim 12 wherein the rear axle mount can be moved between a first position and a second position and wherein adjusting the rear axle mount between first and second positions adjusts an effective length of the snowmobile track.

14. The snowmobile of claim 13, wherein the rear axle second position places the rear axle at a different vertical position relative to the frame than when the rear axle mount is in the first position.

* * * * *